US012661587B2

(12) United States Patent
Comer et al.

(10) Patent No.: US 12,661,587 B2
(45) Date of Patent: Jun. 23, 2026

(54) DETERMINING USER INTERACTION WITH USER INTERFACE ELEMENTS

(71) Applicant: Dell Products L.P., Round Rock, TX (US)

(72) Inventors: Ryan Nicholas Comer, Round Rock, TX (US); Jake Mitchell Leland, Round Rock, TX (US); Erik Summa, Austin, TX (US); Jyoti Jasmine Luu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 18/063,491

(22) Filed: Dec. 8, 2022

(65) Prior Publication Data

US 2024/0189715 A1 Jun. 13, 2024

(51) Int. Cl.
| | |
|---|---|
| *A63F 13/537* | (2014.01) |
| *A63F 13/533* | (2014.01) |
| *G06F 3/0482* | (2013.01) |
| *G06F 3/0484* | (2022.01) |
| *G06T 11/00* | (2006.01) |

(52) U.S. Cl.
CPC .......... *A63F 13/537* (2014.09); *A63F 13/533* (2014.09); *G06F 3/0482* (2013.01); *G06F 3/0484* (2013.01); *G06T 11/00* (2013.01); *A63F 2300/303* (2013.01); *A63F 2300/308* (2013.01); *G06F 2203/04804* (2013.01); *G06T 2200/24* (2013.01)

(58) Field of Classification Search
CPC .................. A63F 13/537; A63F 13/533; A63F 2300/303; A63F 2300/308; G06F 3/0482; G06F 3/0484; G06F 2203/04804; G06T 11/00; G06T 2200/24
See application file for complete search history.

(56) References Cited

U.S. PATENT DOCUMENTS

| | | | |
|---|---|---|---|
| 10,955,985 B2 * | 3/2021 | Cunico ................. | G06F 3/0481 |
| 11,003,330 B1 * | 5/2021 | Russo ................. | G06F 3/04842 |

(Continued)

OTHER PUBLICATIONS

Kang et al., "Instance Segmentation Method of User Interface Component of Games", Appl. Sci., 2020, 10, 6502.

(Continued)

*Primary Examiner* — Malina D. Blaise
(74) *Attorney, Agent, or Firm* — Norton Rose Fulbright US LLP

(57) ABSTRACT

Systems and methods described herein may provide a system that adjusts a user interface (UI) of a game in a non-obtrusive way to a user. The system may determine the least obtrusive area(s) on the screen for a UI element game overlay to be presented, at least in part by determining an importance level for area on the screen containing a UI element. The importance level for an area on the screen may be determined using a generated heat map that indicates the importance values of various areas of the screen. The heat map may be generated with inputs including one or more of user interactions with UI elements, game context, UI element rate of change, user matching, and user preferences. The system may temporarily hide UI elements from display that are determined to be below a threshold importance level.

17 Claims, 10 Drawing Sheets

(56) References Cited

U.S. PATENT DOCUMENTS

| | | | | |
|---|---|---|---|---|
| 12,175,397 | B2 * | 12/2024 | Mubarek | G06Q 50/40 |
| 2019/0102944 | A1 * | 4/2019 | Han | G06F 3/012 |
| 2019/0138194 | A1 * | 5/2019 | Ryan | G06F 16/958 |
| 2019/0304035 | A1 * | 10/2019 | Zaatarah | G06Q 10/40 |
| 2020/0219323 | A1 * | 7/2020 | Varshney | H04L 51/52 |
| 2020/0348829 | A1 * | 11/2020 | Fay | G06F 3/0482 |
| 2021/0110286 | A1 * | 4/2021 | Hewitt | G06N 5/04 |
| 2021/0112647 | A1 * | 4/2021 | Coleman | G01S 17/42 |
| 2022/0188373 | A1 * | 6/2022 | Fujiu | G06F 9/44505 |
| 2024/0189714 | A1 * | 6/2024 | Comer | A63F 13/26 |

OTHER PUBLICATIONS

Unity, "Creating a custom render pipeline based on the Scriptable Render Pipeline", Unity User Manual 2021.3 (LTS), published Dec. 2, 2022.
Vink, Emelie, "Tobii Eye Tracking debuts in eSports", Sep. 12, 2017, https://medium.com/@emelie.vink/tobii-eye-tracking-debuts-in-esports-4162b10d5e04.

* cited by examiner

700

Detect a plurality of user interface (UI) elements included in a UI of an application displayed on a display of a device — 702

Determine an area of the display that is free of overlap with one of the plurality of UI elements and sized to accommodate a UI overlay — 704

Display the UI overlay in the determined area and overlayed over the application — 706

800

Determine an area of a display having a user importance value below a predetermined threshold value based on a generated heat map

802

Display a UI overlay in the determined area and overlayed over an application session

804

900

Identify a UI element disposed in an area of a display having a user importance value below a predetermined threshold value based on a generated heat map

902

Hide the identified UI element from presentation on the display

904

DETERMINING USER INTERACTION WITH USER INTERFACE ELEMENTS

FIELD OF THE DISCLOSURE

The instant disclosure relates to information handling systems. More specifically, portions of this disclosure relate to modifying presentation of one or more applications on a display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Gaming applications presented on a device display (e.g., a computer monitor, TV, phone, tablet, etc.) are typically broken up into two parts for their rendered frames—the 2D or 3D world of the game and the user interface (UI). The UI may contain user input elements for user interaction (e.g., buttons) and textual/visual elements that contain information about the game (e.g., a mini map). The UI for different games can have a variety of complexities with different elements occupying different portions of a display. For example, the UI for different games may have UI elements of various sizes and positions on the display. Additionally, the various devices on which a gaming application could be displayed can have different capabilities as well as displays with different sizes and aspect ratios. Presenting the gaming application, including the UI, on a display in a practical, non-obtrusive way is critical to the user experience.

Aspects of embodiments of this disclosure involve adjusting a UI in a non-obtrusive way to a user. For instance, adding UI element game overlays can provide useful information to a user that augments the user's gaming experience. If a UI element game overlay covers up information that a user needs to play a game, however, then the user's gaming experience suffers. Aspects of embodiments of this disclosure provide for determining the least obtrusive area(s) on the screen for a UI element game overlay to be presented, at least in part by determining an importance level for each UI element on the screen. Other aspects of embodiments of this disclosure provide for determining an importance level for each UI element on the screen and hiding UI elements that are below a threshold importance level.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. If the user moves environments mid-game, the importance of certain UI elements to the user may change based on a differently-sized consumption device (e.g., moving from a large TV to a computer monitor), which can alter the location(s) where the system presents UI element game overlays. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously. An example UI element game overlay may be that a user's sibling just started playing the same game in a different room, and the system determines the least obtrusive location on the screen to display the overlay.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, includes detecting a plurality of user interface (UI) elements included in a UI of an application displayed on a display of a device; receiving indications of user interactions with the plurality of UI elements; and generating a heat map based on the user interactions with the plurality of UI elements, the heat map indicating a user importance value of each of a plurality of areas of the display of the device.

In certain embodiments, the method further includes determining an area of the display that is free of overlap with one of the plurality of UI elements and sized to accommodate a UI overlay; and displaying the UI overlay in the determined area and overlayed over the application. Displaying a UI overlay where it does not overlap with other UI elements on the display is the least obtrusive way to present a UI overlay.

In certain embodiments, the method further includes determining an area of the display having a user importance value below a predetermined threshold value based on the generated heat map; and displaying a UI overlay in the determined area and overlayed over the application. Displaying the UI overlay in an area with a below threshold importance introduces the least obtrusion on the display.

In certain embodiments, the method further includes identifying a UI element disposed in an area of the display having a user importance value below a predetermined threshold value based on the generated heat map; and hiding the identified UI element from presentation on the display. Hiding unimportant UI elements from display until the hidden UI elements are needed frees up space on the screen for gameplay.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
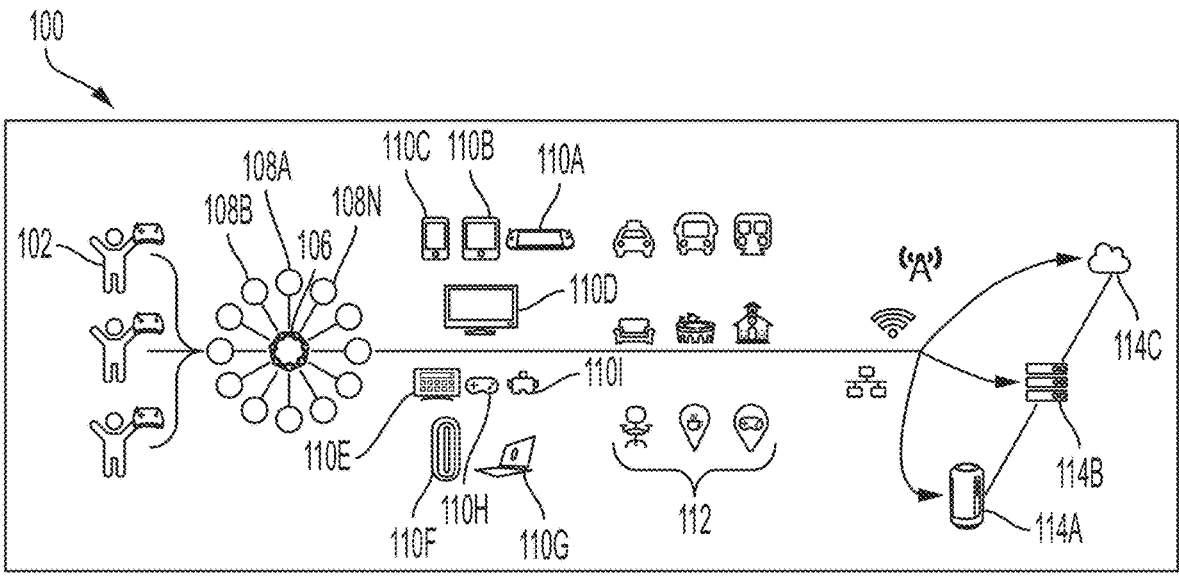
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, personal computers, and virtual reality headsets) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

As described above, the host devices may display rendered content from a game play session (or other application session), and in some configurations also receive user input for interacting with the session. The rendered content may include a user interface (UI) with which a user may interact. The UI may include multiple UI elements (e.g., a map, health bar) and in some instances may include a UI overlay (e.g., a notification) that is temporarily displayed. The hub device can identify the least obtrusive area(s) on a host device's screen to display the UI overlay. Additionally or alternatively, the hub device can identify a UI element that is below a threshold importance and hide the UI element from display until the user needs the UI element.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according to some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
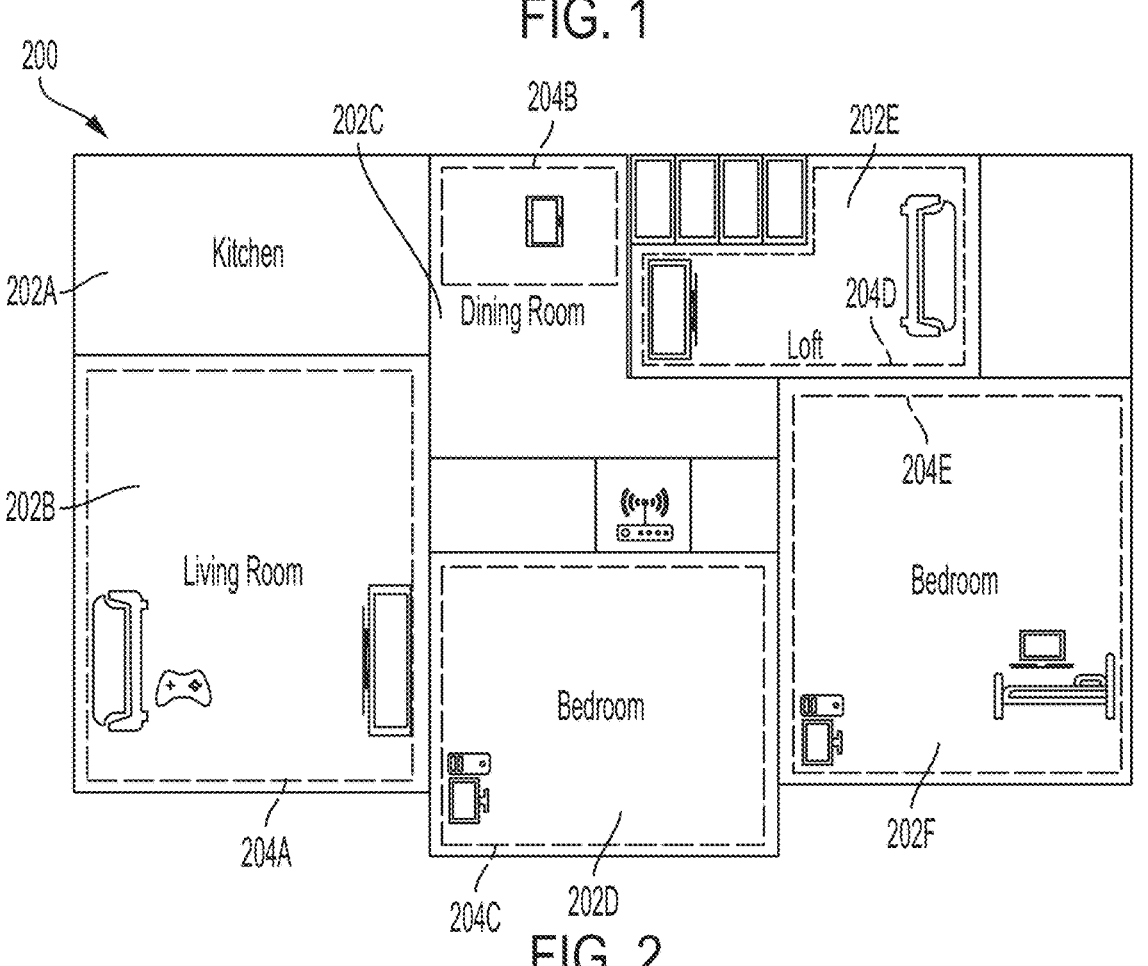
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
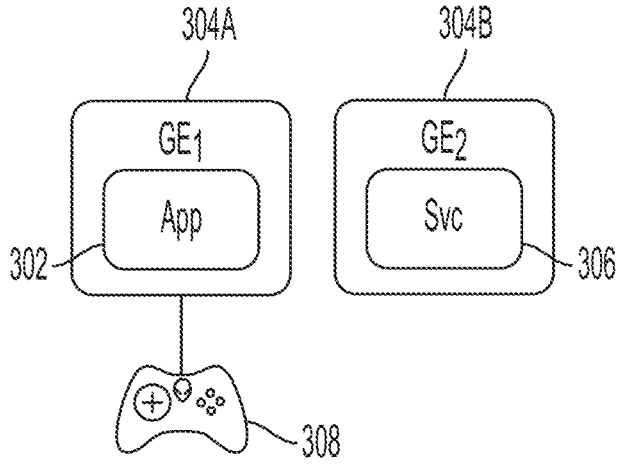
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
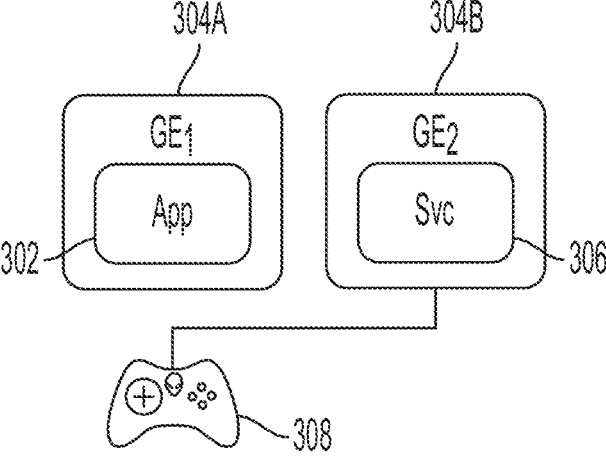
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
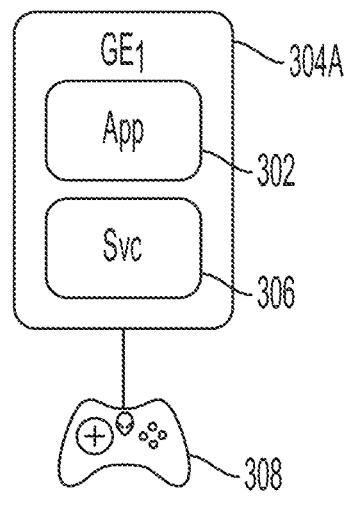
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
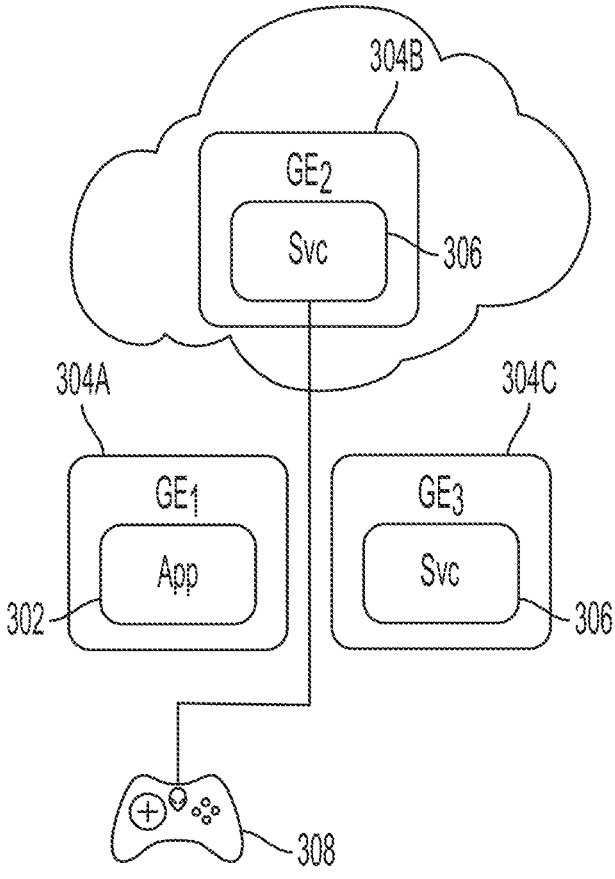
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application

302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
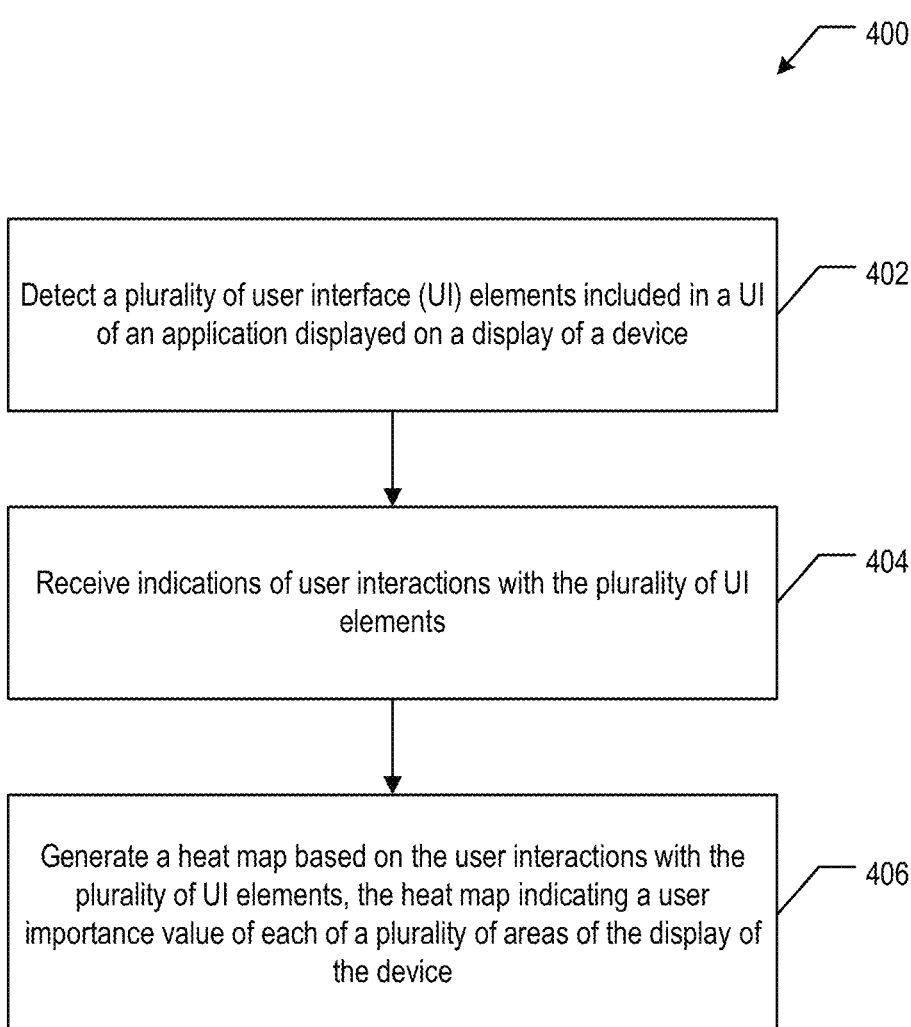
FIG. 4 is a flow chart of a method of generating a heat map indicating importance levels of areas of a display according to some embodiments of the disclosure.
Figure 5:
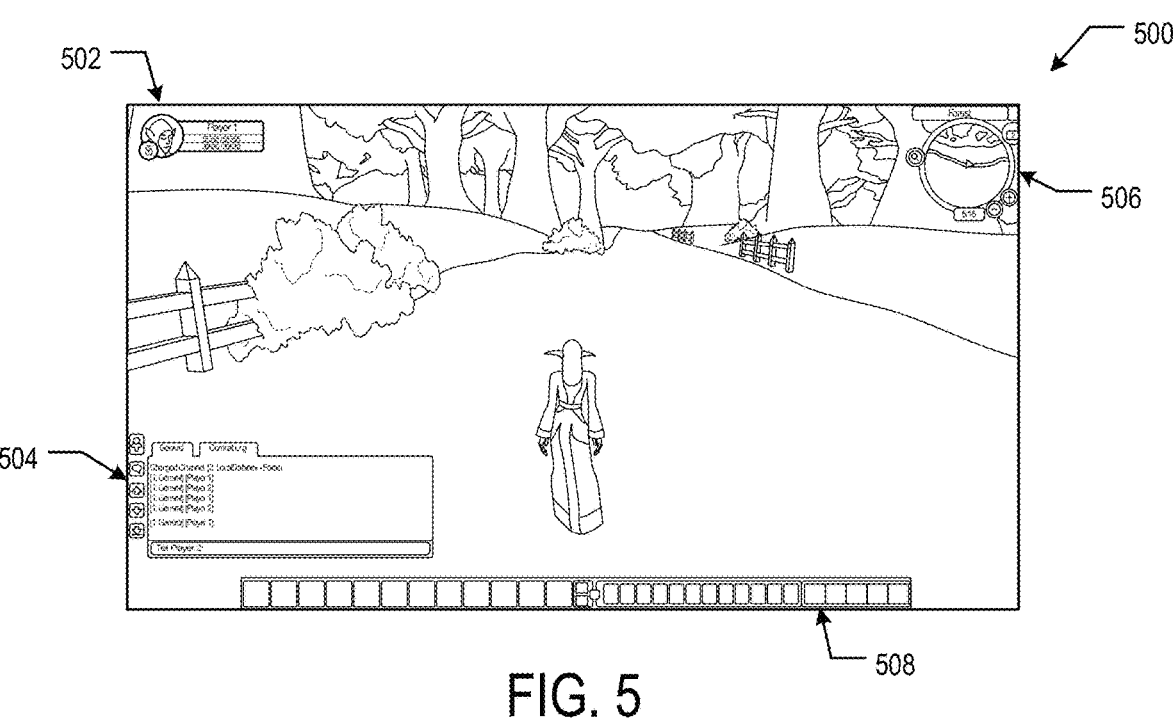
FIG. 5 is an example game application having a user interface (UI) with multiple UI elements according to some embodiments of the disclosure.

FIG. 4 is a flow chart of an example method 400 for generating a heat map that indicates importance levels of areas of a display of a device (e.g., television, mobile computer, tablet computer, personal computer, and virtual reality headset) for a user interacting with an application session (e.g., a gameplay session). The example method 400 and subsequent example methods will be described in the context of a gaming application displayed on a computer monitor, though other suitable applications and displaying devices are applicable. At block 402, multiple user interface (UI) elements included in a UI of a gameplay session displayed on a computer monitor are detected (e.g., by the hub device or other suitable computing device). For example, with reference to the display 500 of FIG. 5, the detected UI elements may include a user ID 502, a chat log 504, a minimap 506, and a game progress bar 508. Detecting the UI elements may include determining a set of display coordinates for a single frame that represent the locations of UI elements in the gaming application stream. The UI elements may be detected using any suitable method for segmenting the UI elements from a game stream. In some aspects of the method 400, the detected UI elements are classified (e.g., using a machine learning model) as a type of UI element. For example, types of UI elements include a minimap, chat log, user ID, health bar, etc. Classifying UI elements as a type can provide context for the importance a user attributes to a UI element.

At block 404, indications of user interactions with the UI elements are received (e.g., at the hub device or other suitable computing device). User interactions may be monitored via mouse input, keyboard input, game controller input, eye tracking technology, augmented reality (AR)/virtual reality (VR) input, or other suitable manners of detecting a user interaction with a UI element during a gameplay session. For example, the hub device or other suitable computing device may receive an indication that the user clicked on the chat log 504 with a mouse cursor and typed in the chat log 504 using a keyboard.

At block 406, a heat map is generated (e.g., using a machine learning model) based on the user interactions with the UI elements. The heat map indicates a user importance value of each of a plurality of areas of the computer monitor display. Some of these areas of the computer monitor display correspond to the UI elements, though an importance value of other areas of the computer monitor display may also be included such as a center area of the computer monitor display within which gameplay occurs. UI elements that the user interacts with more than others are scored higher in importance.

In some aspects of the method 400, the heat map is generated based on input parameters in addition to the user interaction with the UI elements. In one example, UI elements are also monitored for a rate at which the UI elements change, and the rates are input when generating the heat map. Static UI elements such as textual objectives that don't change are scored lower in importance than dynamic UI elements that change with gameplay, and dynamic UI elements with a higher rate of change are scored higher in importance than dynamic UI elements with a lower rate of change. In another example, a user may set rules that are input when generating the heat map. For instance, a user may indicate one or more regions of the display (e.g., the center) that are off-limits from any activity other than gameplay, or may indicate a region that is allowed to be modified (e.g., present a UI overlay).

In another example, current game context is input when generating the heat map such as a current user, the game being played, a current game mode or level, a selected character or item, etc. Each of these current game context attributes may affect an importance of a UI element. For instance, one user may heavily use the minimap 506 while playing a particular game whereas a different user may not. In another example still, a heat map previously generated for a particular user is compared to a database of heat maps of other similar users for a given game context. The heat maps of these similar users may be input when generating a new heat map for the particular user. The idea behind this input is that if other similar users placed a certain importance value on a UI element, then the particular user is likely to as well. The particular user can also compare the particular user's heat map to heat maps of other users (e.g., a professional) to improve the particular user's skill by identifying UI elements that the particular user interacts with too much or not enough. All of the above inputs, or a combination of some of them, may be used to generate the heat map in various embodiments. A generated heat map may be updated the more a user plays a game and interacts with UI elements.

Figure 6:
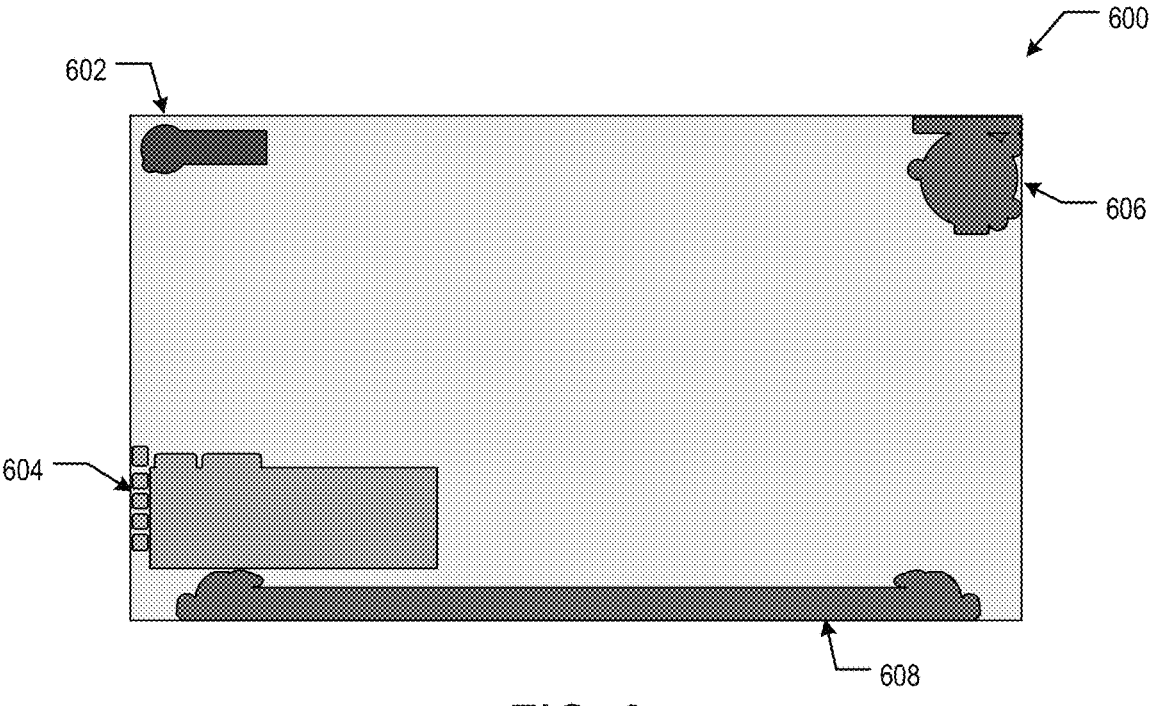
FIG. 6 is a heat map for the game application of FIG. 5 according to some embodiments of the disclosure.

FIG. 6 shows an example heat map 600 generated for the display 500 that shows a game being played by a user. The heat map 600 includes an area 602 corresponding to the user ID 502, an area 604 corresponding to the chat log 504, an area 606 corresponding to the minimap 506, an area 608 corresponding to the game progress bar 508, and a remaining area. Each of these areas is assigned a user importance value. In this example, the area 602 is assigned the highest user importance value, the areas 606 and 608 are assigned an intermediate importance value, and the area 604 is assigned a low importance value. The remaining area of the heat map 600 is assigned the lowest importance value. In other examples, user rules may assign higher importance values to portions of the remaining area.

Figure 7:
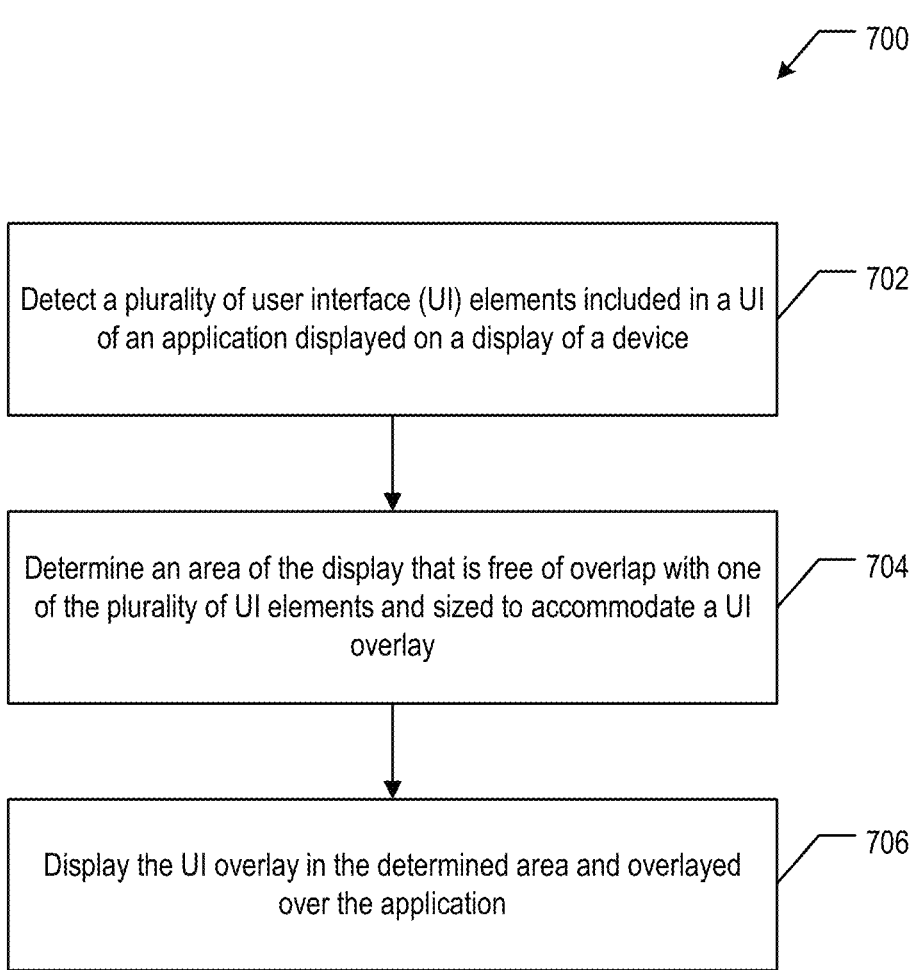
FIG. 7 is a flow chart of a method of displaying a UI overlay according to some embodiments of the disclosure.

Embodiments of the present disclosure involve presenting a UI of an application session (e.g., a gaming application session) in an unobstructive manner. For instance, aspects of these embodiments involve displaying a UI overlay during a gaming application session. Example UI overlays include, a game guide (e.g., what to do next), notifications (e.g., message, friend joined the game, etc.), keybinds, etc. Other aspects of these embodiments involve hiding minimally utilized UI elements until they are needed to free up space on the display. FIG. 7 is a flow chart of an example method 700 for determining an area of a display at which to display a UI overlay. At block 702, multiple user interface (UI) elements included in a UI of a gameplay session displayed on a computer monitor are detected (e.g., by the hub device or other suitable computing device). The description of block 502 above applies equally to block 702. At block 704, an area of the computer monitor display that is free of overlap with one of the UI elements and sized to accommodate a UI overlay is determined. In at least some aspects of the method 700, the determined area must also be compliant with any user rules that prohibit certain areas of the computer monitor display from UI overlays. At block 706, the UI overlay is displayed in the determined area and overlayed over the application.

Figure 8:
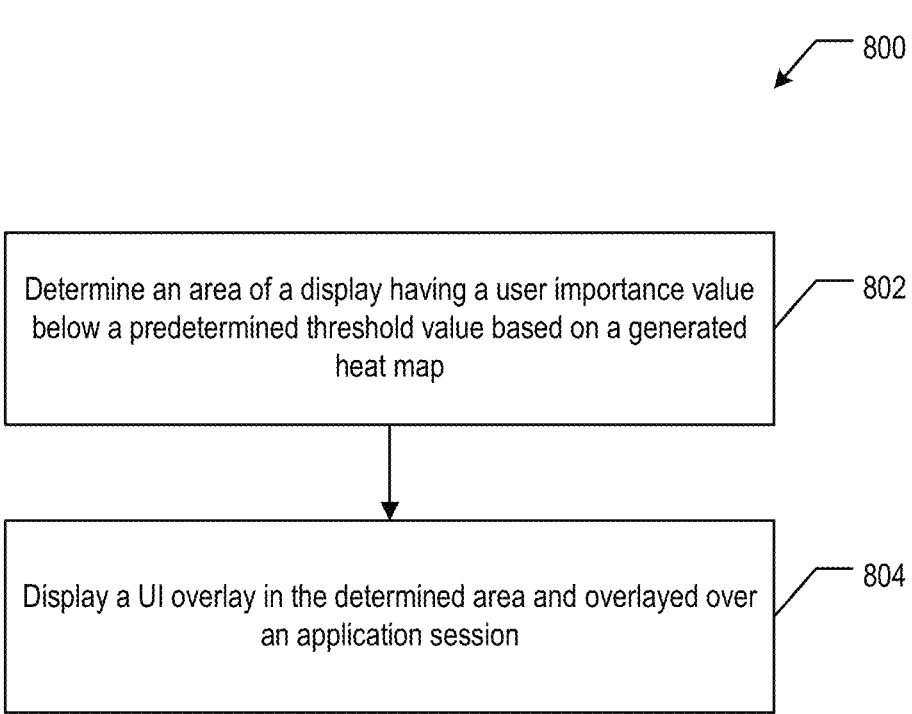
FIG. 8 is a flow chart of a method of displaying a UI overlay according to some embodiments of the disclosure.

In some instances, there may not be an area of the display at which to display the UI overlay that is entirely free of overlap with a UI element, or that is entirely free of overlap with a UI element and compliant with all user rules. In such instances, the generated heat map (e.g., the heat map 600) may be used for determining where to display the UI overlay with minimal importance overlap. FIG. 8 is a flow chart of an example method 800 for determining an area of a display at which to least obtrusively display a UI overlay. At block 802, an area of a display (e.g., the computer monitor display) having a user importance value below a predetermined threshold value is determined based on a generated heat map (e.g., the heat map 600). In this example, the user importance value of the determined area is a proportional sum of the areas of the heat map 600 that the determined area overlaps. If the determined area overlaps only the area 604, for example, then the determined area has a user importance value equal to the user importance value of the area 604. If only a portion of the determined area overlaps the area 604, then the user importance value of the determined area is proportional to the amount of overlap. The predetermined threshold value may be set by the user.

At block 804, a UI overlay is displayed in the determined area and overlayed over an application session. In some embodiments, the UI overlay may be displayed with a determined transparency. For example, the UI overlay can have a transparency that is proportional to the user importance value(s) of the area(s) of the heat map where the UI overlay is overlapping.

Figure 9:
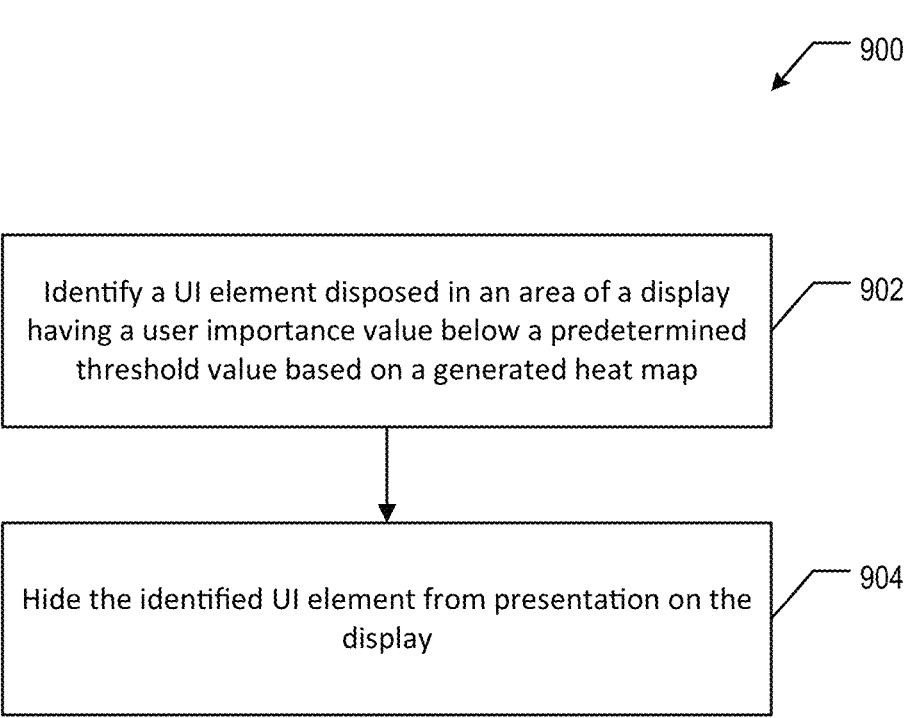
FIG. 9 is a flow chart of a method of hiding a UI element according to some embodiments of the disclosure.

FIG. 9 is a flow chart of an example method 900 for hiding a UI element. At block 902, a UI element disposed in an area of a display (e.g., the computer monitor display) having a user importance value below a predetermined threshold value is identified based on a generated heat map (e.g., the heat map 600). The user importance value of the area of the computer monitor display is determined in the same manner described above for FIG. 8 at block 802. The predetermined threshold value for hiding a UI element may be set by the user and is different than the predetermined threshold value for determining an area to display a UI overlay. In some embodiments, it is also determined that a user is not focusing on the identified UI element to ensure that the user is not actively using the identified UI element. For example, a mouse cursor is not hovering over the UI element, eye tracking technology does not identify the user's eyes as looking at the UI element, etc.

At block 904, the identified UI element is hidden from presentation on the display. For instance, a UI layer includes each of the UI elements and hiding the identified UI element includes hiding a region of a UI layer that includes the identified UI element. The hidden UI element may be subsequently displayed upon the area of the computer monitor display containing the hidden UI element having a user importance value that meets or exceeds the predetermined threshold value. For example, a user interaction (e.g., cursor hover, eye contact, etc.) with the area of the display including the hidden UI element can result in the area having a user importance value that meets or exceeds the predetermined threshold value.

Figure 10:
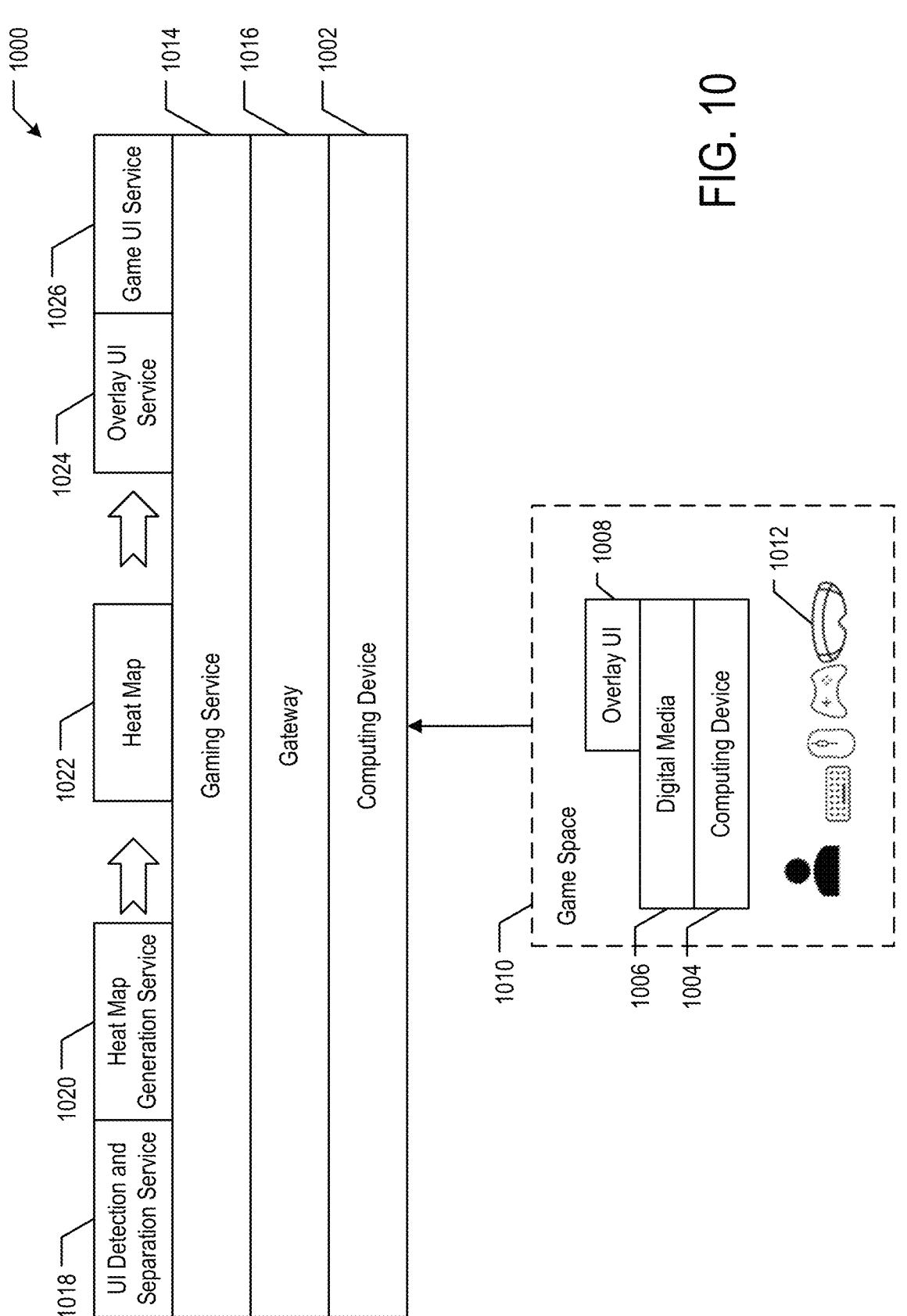
FIG. 10 shows a system for generating and utilizing a heat map for adjusting a UI according to some embodiments of the disclosure.

FIG. 10 depicts a system 1000 according to an exemplary embodiment of the present disclosure. The system 1000 may be configured to generate a user importance heat map 1022 and modify a UI of a gaming application, such as a game application being played by a user in a game space 1010. The system 1000 includes a computing device 1002 (e.g., a server), which may be configured to generate the heat map 1022 and display a UI overlay 1008 in an unobtrusive manner or hide an unimportant UI element. In particular, the game space 1010 includes the computing device 1004. The game space 1010 may be an exemplary implementation of the environments 204A-C and/or the rooms 202A-E. The computing device 1004 may include one or more gaming consoles, laptop computers, smartphones, smart home speakers, smart home devices, gaming devices such as controllers, and/or any other type of computing device (e.g., personal computing device, professional computing device).

The computing device 1004 may display digital media 1006 in the game space 1010. The digital media 1006 may include a gaming application. The gaming application includes game UI elements. The game space 1010 may also include periphery devices 1012 (e.g., keyboard, mouse, game controller, virtual reality headset) that users in the game space 1010 may use to control the digital media 1006.

The computing device 1002 may be configured to generate a heat map 1022 and display an overlay UI 1008 over the digital media 1006 on the computing device 1004. The computing device 1002 may also be configured to hide an unimportant UI element in the digital media 1006 displayed on the computing device 1004. The computing device 1002 may include a gateway 1016 and the gaming service 1014. The gateway 1016 may be responsible for network communication and other services. For example, the computing device 1002 may be an orchestrator or other computing device for a distributed computing environment, and the gateway 1016 may coordinate communication with the computing devices in the distributed computing environment. The gateway 1016 may further implement a gaming service 1014 which may provide one or more gaming services to requesting computing device 1004. In certain implementations, the gaming service 1014 may be configured to generate a heat map 1022 and display an overlay UI 1008 over the digital media 1006 on the computing device 1004, or hide an unimportant UI element in the digital media 1006. Accordingly, the gaming service 1014 may include a UI detection and separation service 1018, a heat map generation service 1020, an overlay UI service 1024, and a game UI service 1026.

The operations of the computing device 1002 and in particular of the UI detection and separation service 1018, the heat map generation service 1020, the overlay UI service 1024, and the game UI service 1026 are described in greater detail above in connection with FIGS. 4 and 7-9. For example, the UI detection and separation service 1018 may be configured to detect UI elements in a UI of a gaming application (e.g., block 402). The heat map generation service 1020 may be configured to generate a heat map indicated user importance of areas of a display (e.g., block 406). The overlay UI service 1024 may be configured to display a UI overlay in an unobtrusive manner (e.g., methods 700 and 800). The game UI service 1026 may be configured to hide a UI element from display (e.g., method 900).

Figure 11:
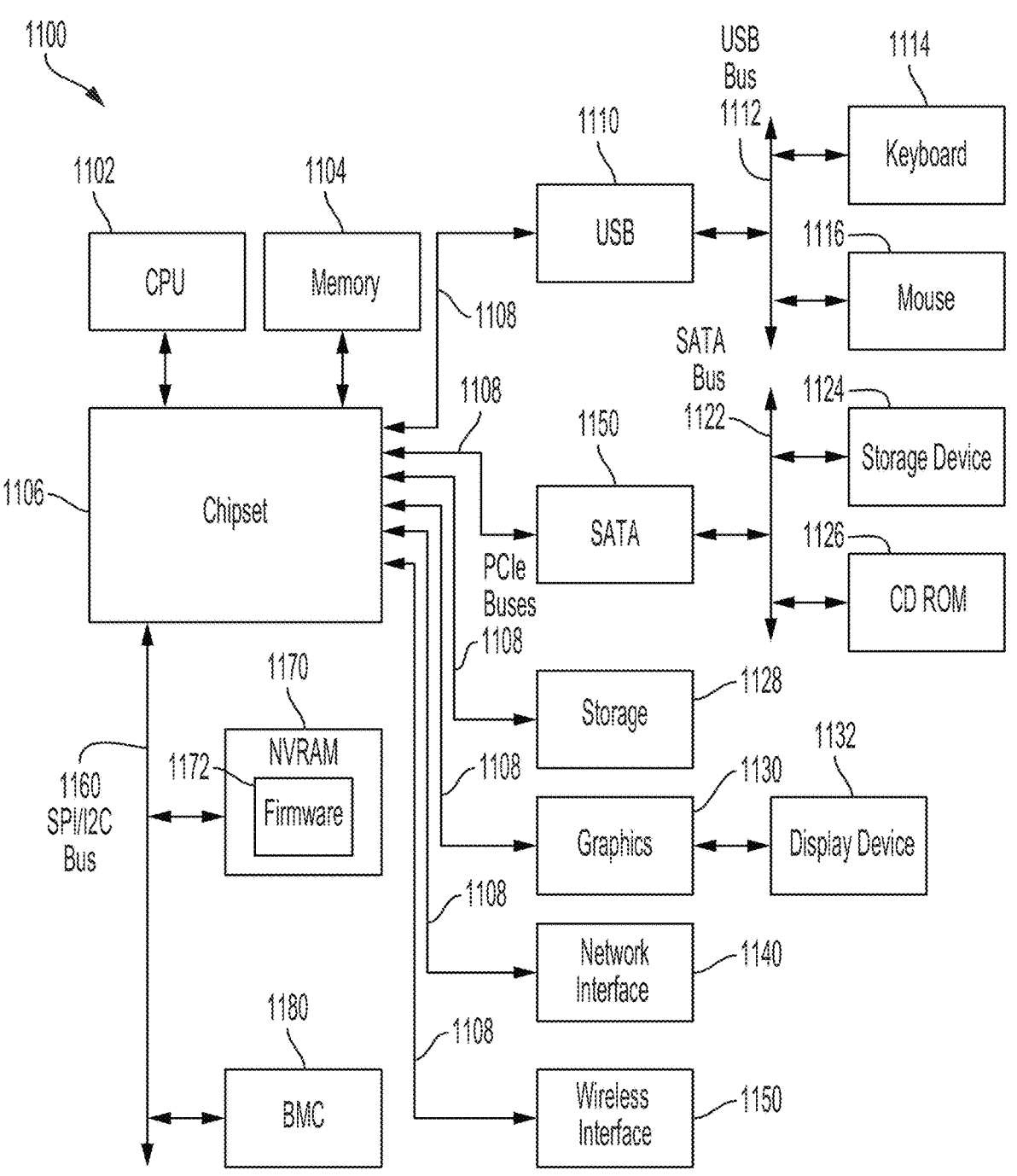
FIG. 11 is a schematic block diagram of an example information handling system according to some embodiments of the disclosure.

FIG. 11 illustrates an example information handling system 1100. Information handling system 1100 may include a processor 1102 (e.g., a central processing unit (CPU)), a memory (e.g., a dynamic random-access memory (DRAM)) 1104, and a chipset 1106. In some embodiments, one or more of the processor 1102, the memory 1104, and the chipset 1106 may be included on a motherboard (also referred to as a mainboard), which is a printed circuit board (PCB) with embedded conductors organized as transmission lines between the processor 1102, the memory 1104, the chipset 1106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1102, the memory 1104, the chipset 1106, and/or other components may be organized as a System on Chip (SoC).

The processor 1102 may execute program code by accessing instructions loaded into memory 1104 from a storage device, executing the instructions to operate on data also loaded into memory 1104 from a storage device, and generate output data that is stored back into memory 1104 or sent to another component. The processor 1102 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1106 may facilitate the transfer of data between the processor 1102, the memory 1104, and other components. In some embodiments, chipset 1106 may include two or more integrated circuits (ICs), such as a northbridge controller coupled to the processor 1102, the memory 1104, and a southbridge controller, with the southbridge controller coupled to the other components such as USB 1110, SATA 1120, and PCIe buses 1108. The chipset 1106 may couple to other components through one or more PCIe buses 1108.

Some components may be coupled to one bus line of the PCIe buses 1108, whereas some components may be coupled to more than one bus line of the PCIe buses 1108. One example component is a universal serial bus (USB) controller 1110, which interfaces the chipset 1106 to a USB bus 1112. A USB bus 1112 may couple input/output components such as a keyboard 1114 and a mouse 1116, but also other components such as USB flash drives, or another information handling system. Another example component is a SATA bus controller 1120, which couples the chipset 1106 to a SATA bus 1122. The SATA bus 1122 may facilitate efficient transfer of data between the chipset 1106 and components coupled to the chipset 1106 and a storage device 1124 (e.g., a hard disk drive (HDD) or solid-state disk drive (SDD)) and/or a compact disc read-only memory (CD-ROM) 1126. The PCIe bus 1108 may also couple the chipset 1106 directly to a storage device 1128 (e.g., a solid-state disk drive (SDD)). A further example of an example component is a graphics device 1130 (e.g., a graphics processing unit (GPU)) for generating output to a display device 1132, a network interface controller (NIC) 1140, and/or a wireless interface 1150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1106 may also be coupled to a serial peripheral interface (SPI) and/or Inter-Integrated Circuit (I2C) bus 1160, which couples the chipset 1106 to system management components. For example, a non-volatile random-access memory (NVRAM) 1170 for storing firmware 1172 may be coupled to the bus 1160. As another example, a controller, such as a baseboard management controller (BMC) 1180, may be coupled to the chipset 1106 through the bus 1160.

BMC 1180 may be referred to as a service processor or embedded controller (EC). Capabilities and functions provided by BMC 1180 may vary considerably based on the type of information handling system. For example, the term baseboard management system may be used to describe an embedded processor included at a server, while an embedded controller may be found in a consumer-level device. As disclosed herein, BMC 1180 represents a processing device different from processor 1102, which provides various management functions for information handling system 1100. For example, an embedded controller may be responsible for power management, cooling management, and the like. An embedded controller included at a data storage system may be referred to as a storage enclosure processor or a chassis processor.

System 1100 may include additional processors that are configured to provide localized or specific control functions, such as a battery management controller. Bus 1160 can include one or more busses, including a Serial Peripheral Interface (SPI) bus, an Inter-Integrated Circuit (I2C) bus, a system management bus (SMBUS), a power management bus (PMBUS), or the like. BMC 1180 may be configured to provide out-of-band access to devices at information handling system 1100. Out-of-band access in the context of the bus 1160 may refer to operations performed prior to execution of firmware 1172 by processor 1102 to initialize operation of system 1100.

Firmware 1172 may include instructions executable by processor 102 to initialize and test the hardware components of system 1100. For example, the instructions may cause the processor 1102 to execute a power-on self-test (POST). The instructions may further cause the processor 1102 to load a boot loader or an operating system (OS) from a mass storage device. Firmware 1172 additionally may provide an abstraction layer for the hardware, such as a consistent way for application programs and operating systems to interact with the keyboard, display, and other input/output devices. When power is first applied to information handling system 1100, the system may begin a sequence of initialization procedures, such as a boot procedure or a secure boot procedure. During the initialization sequence, also referred to as a boot sequence, components of system 1100 may be configured and enabled for operation and device drivers may be installed. Device drivers may provide an interface through which other components of the system 1100 can communicate with a corresponding device. The firmware 1172 may include a basic input-output system (BIOS) and/or include a unified extensible firmware interface (UEFI). Firmware 1172 may also include one or more firmware modules of the information handling system. Additionally, configuration settings for the firmware 1172 and firmware of the information handling system 1100 may be stored in the NVRAM 1170. NVRAM 1170 may, for example, be a non-volatile firmware memory of the information handling system 1100 and may store a firmware memory map namespace 1100 of the information handling system. NVRAM 1170 may further store one or more container-specific firmware memory map namespaces for one or more containers concurrently executed by the information handling system.

Information handling system 1100 may include additional components and additional busses, not shown for clarity. For example, system 1100 may include multiple processor cores (either within processor 1102 or separately coupled to the chipset 1106 or through the PCIe buses 1108), audio devices (such as may be coupled to the chipset 1106 through one of the PCIe busses 1108), or the like. While a particular arrangement of bus technologies and interconnections is illustrated for the purpose of example, one of skill will appreciate that the techniques disclosed herein are applicable to other system architectures. System 1100 may include multiple processors and/or redundant bus controllers. In some embodiments, one or more components may be integrated together in an integrated circuit (IC), which is circuitry built on a common substrate. For example, portions of chipset 1106 can be integrated within processor 1102. Additional components of information handling system 1100 may include one or more storage devices that may store machine-executable code, one or more communications ports for communicating with external devices, and various input and output (I/O) devices, such as a keyboard, a mouse, and a video display.

In some embodiments, processor 1102 may include multiple processors, such as multiple processing cores for parallel processing by the information handling system 1100. For example, the information handling system 1100 may include a server comprising multiple processors for parallel processing. In some embodiments, the information handling system 1100 may support virtual machine (VM) operation, with multiple virtualized instances of one or more operating systems executed in parallel by the information handling system 1100. For example, resources, such as processors or processing cores of the information handling system may be assigned to multiple containerized instances of one or more operating systems of the information handling system 1100 executed in parallel. A container may, for example, be a virtual machine executed by the information handling system 1100 for execution of an instance of an operating system by the information handling system 1100. Thus, for example, multiple users may remotely connect to the information handling system 1100, such as in a cloud computing configuration, to utilize resources of the information handling system 1100, such as memory, processors, and other hardware, firmware, and software capabilities of the information handling system 1100. Parallel execution of multiple containers by the information handling system 1100 may allow the information handling system 1100 to execute tasks for multiple users in parallel secure virtual environments.

The schematic or flow chart diagrams of FIG. 4, FIG. 7, FIG. 8, and FIG. 9 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

initializing an application session as a service such that a user interface (UI) of the application session is displayed on a display of a device;

detecting a plurality of UI elements included in the UI;

receiving indications of user interactions with the plurality of UI elements;

determining a UI element type of a first UI element of the plurality of UI elements;

generating a heat map based on the user interactions with the plurality of UI elements and the UI element type of the first UI element, the heat map indicating an importance score of each area of a plurality of areas of the display of the device, the importance score being with respect to a user that provides the user interactions;

determining an area of the display having an importance score below a predetermined threshold value based on the heat map;

modifying the UI such that a UI overlay is displayed in the determined area and overlayed over the application session;

identifying a second UI element of the plurality of UI elements that is disposed in an area of the display having an importance score below a second predetermined threshold value based on the generated heat map; and hiding the second UI element that is identified from presentation on the display.

2. The method of claim 1, further comprising:

receiving an indication of information to provide on the display overlaid on the application;

determining an area of the display that is free of overlap with one of the plurality of UI elements and sized to accommodate the UI overlay comprising the information; and displaying the UI overlay in the determined area and overlayed over the application.

3. The method of claim 1, further comprising determining a transparency value for the UI overlay based on the frequency of user interaction of the determined area.

4. The method of claim 1, wherein hiding the second UI element includes determining regions of the display for which a UI layer is hidden, the UI layer including the plurality of UI elements.

5. The method of claim 1, further comprising displaying the second UI element that is hidden in response to receiving an indication of a user interaction with the area of the display including the second UI element that is hidden.

6. The method of claim 1, wherein detecting the plurality of UI elements includes detecting coordinates of each of the plurality of UI elements on the display.

7. The method of claim 1, wherein a first UI element changes over time during the application session, and wherein generating the heat map is further based on a rate of change of the first UI element.

8. The method of claim 1, wherein generating the heat map is further based on rules set by the user regarding at least one area of the plurality of areas of the display of the device.

9. The method of claim 1, wherein the application session is a gaming session, and wherein generating the heat map is further based on a game context of a game application rendered by the gaming session.

10. The method of claim 1, wherein the application session is a gaming session, and wherein the gaming session is initialized as the service such that a game application is displayed on the display of the device along with the UI.

11. An information handling system, comprising:

a memory;

a processor coupled to the memory, wherein the processor is configured to perform steps comprising:

initializing an application session as a service such that a user interface (UI) of the application session is displayed on a display of a device;

detecting a plurality of UI elements included in the UI;

receiving indications of user interactions with the plurality of UI elements;

determining a UI element type of a first UI element of the plurality of UI elements;

generating a heat map based on the user interactions with the plurality of UI elements and the UI element type of the first UI element, the heat map indicating an importance of each area of a plurality of areas of the display of the device, the importance being with respect to a user that provides the user interactions;

determining an area of the display having an importance score below a predetermined threshold value based on the heat map;

modifying the UI such that a UI overlay is displayed in the determined area and overlayed over the application session;

identifying a second UI element of the plurality of UI elements that is disposed in an area of the display having an importance score below a second predetermined threshold value based on the generated heat map; and hiding the second UI element that is identified from presentation on the display.

12. The information handling system of claim 11, the steps further comprising:

determining an area of the display that is free of overlap with one of the plurality of UI elements and sized to accommodate the UI overlay; and displaying the UI overlay in the determined area and overlayed over the application.

13. The information handling system of claim 11, the steps further comprising determining a transparency value for the UI overlay based on the frequency of user interaction of the determined area.

14. The information handling system of claim 11, wherein hiding the second UI element includes determining regions of the display for which a UI layer is hidden, the UI layer including the plurality of UI elements.

15. The information handling system of claim 11, the steps further comprising displaying the second UI element that is hidden in response to receiving an indication of a user interaction with the area of the display including the second UI element that is hidden.

16. A computer program product, comprising:

a non-transitory computer readable medium comprising code for performing steps comprising:

initializing an application session as a service such that a user interface (UI) of the application session is displayed on a display of a device;

detecting a plurality of UI elements included in the UI;

receiving indications of user interactions with the plurality of UI elements;

determining a UI element type of a first UI element of the plurality of UI elements;

generating a heat map based on the user interactions with the plurality of UI elements and the UI element type of the first UI element, the heat map indicating an importance of each area of a plurality of areas of the display of the device, the importance being with respect to a user that provides the user interactions;

determining an area of the display having an importance score below a predetermined threshold value based on the heat map;

modifying the UI such that a UI overlay is displayed in the determined area and overlayed over the application session;

identifying a second UI element of the plurality of UI elements that is disposed in an area of the display having an importance score below a second predetermined threshold value based on the generated heat map; and hiding the second UI element that is identified from presentation on the display.

17. The computer program product of claim 16, wherein the medium further comprises code for performing steps comprising:

receiving an indication of information to provide on the display overlaid on the application;

determining an area of the display that is free of overlap with one of the plurality of UI elements and sized to accommodate the UI overlay comprising the information; and displaying the UI overlay in the determined area and overlayed over the application.

\* \* \* \* \*